(12) United States Patent
Kusakari et al.

(10) Patent No.: US 7,817,053 B2
(45) Date of Patent: Oct. 19, 2010

(54) RECHARGEABLE ELECTRIC TOOL

(75) Inventors: Ichiro Kusakari, Tokyo (JP); Takahiro Nagaoka, Tokyo (JP); Osamu Itagaki, Tokyo (JP); Atsushi Matsuoka, Tokyo (JP)

(73) Assignee: Max Co., Ltd., Tokyo (JP)

( * ) Notice: Subject to any disclaimer, the term of this patent is extended or adjusted under 35 U.S.C. 154(b) by 254 days.

(21) Appl. No.: 11/795,032

(22) PCT Filed: Dec. 27, 2005

(86) PCT No.: PCT/JP2005/023942

§ 371 (c)(1),
(2), (4) Date: Jul. 11, 2007

(87) PCT Pub. No.: WO2006/075524

PCT Pub. Date: Jul. 20, 2006

(65) Prior Publication Data

US 2008/0094236 A1   Apr. 24, 2008

(30) Foreign Application Priority Data

Jan. 12, 2005   (JP)   .......................... P.2005-004644

(51) Int. Cl.
G08B 21/00   (2006.01)

(52) U.S. Cl. .............. 340/636.15; 340/636.1; 324/76.11

(58) Field of Classification Search ............ 340/636.15, 340/636.1; 324/76.11
See application file for complete search history.

(56) References Cited

U.S. PATENT DOCUMENTS

| | | | |
|---|---|---|---|
| 5,549,984 A * | 8/1996 | Dougherty | 429/61 |
| 5,627,472 A * | 5/1997 | Ofer et al. | 324/435 |
| 5,657,417 A | 8/1997 | Troia | |
| 6,577,104 B2 * | 6/2003 | Sakakibara | 320/132 |
| 7,061,246 B2 * | 6/2006 | Dougherty et al. | 324/426 |
| 7,091,699 B2 * | 8/2006 | Mori et al. | 320/132 |
| 7,109,675 B2 * | 9/2006 | Matsunaga et al. | 318/433 |
| 7,176,656 B2 * | 2/2007 | Feldmann | 320/114 |
| 7,191,077 B2 * | 3/2007 | Mese et al. | 702/63 |
| 7,541,773 B2 * | 6/2009 | Funabashi et al. | 320/114 |
| 7,612,525 B2 * | 11/2009 | Ito et al. | 320/106 |
| 2002/0149346 A1 * | 10/2002 | Sakakibara | 320/162 |
| 2002/0175656 A1 * | 11/2002 | Matsunaga et al. | 320/128 |
| 2003/0096158 A1 * | 5/2003 | Takano et al. | 429/90 |

FOREIGN PATENT DOCUMENTS

| | | |
|---|---|---|
| DE | 4204420 | 8/1993 |
| JP | 59-169387 | 9/1984 |
| JP | 61-148570 | 9/1986 |
| JP | 3-165267 | 7/1991 |

(Continued)

*Primary Examiner*—Eric M Blount
(74) *Attorney, Agent, or Firm*—Drnker Biddle & Reath LLP

(57) ABSTRACT

A rechargeable electric tool includes a warning device which monitors a voltage of a power source battery and indicates a warning by means of an LED or a buzzer when the power source voltage is reduced to be equal to or lower than a reference voltage. The tool is configured such that, even when the warning is indicated, a control to interrupt a power supply to a motor is not performed, thereby enabling a usual operation in response to an activating operation on a trigger switch.

6 Claims, 2 Drawing Sheets

FOREIGN PATENT DOCUMENTS

| | | |
|---|---|---|
| JP | 5-26278 | 4/1993 |
| JP | 7-1350 | 1/1995 |
| JP | 7-161340 | 6/1995 |
| JP | 2004-261909 | 9/2004 |
| JP | 2005-1039 | 1/2005 |
| JP | 2005-246563 | 9/2005 |
| RU | 2 158 455 C2 | 10/2000 |
| RU | 2 182 712 C2 | 5/2002 |

* cited by examiner

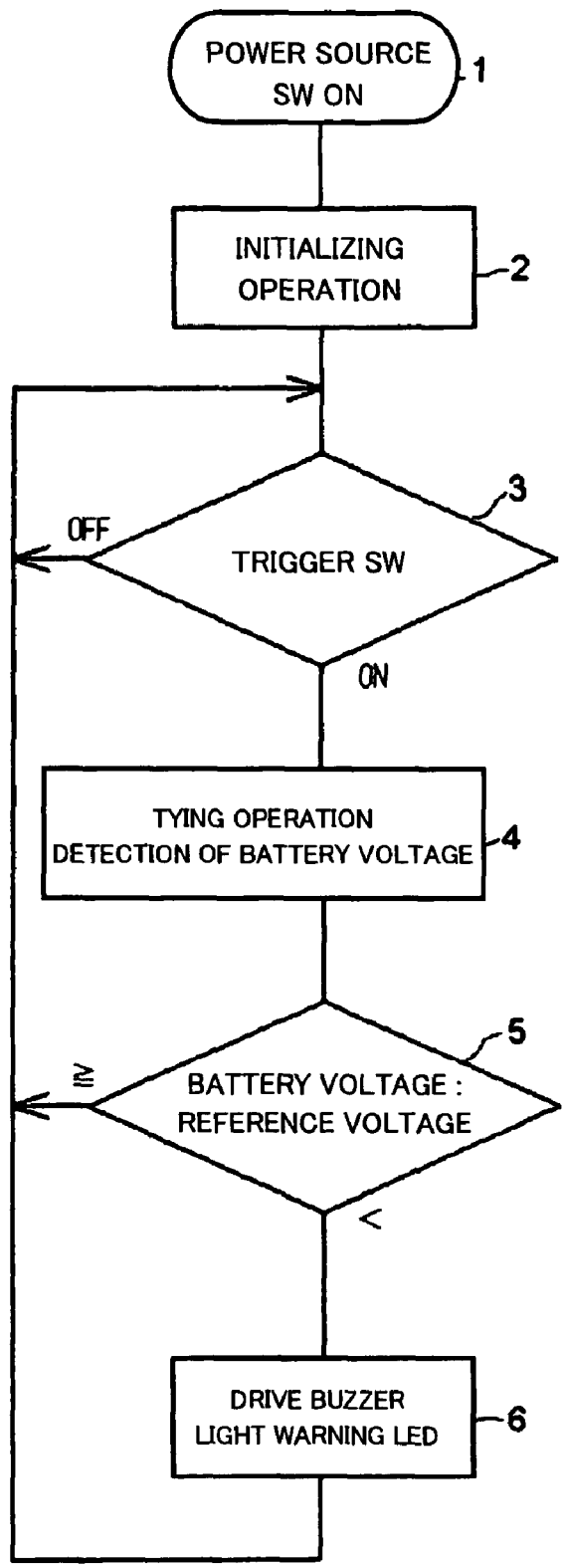

RECHARGEABLE ELECTRIC TOOL

TECHNICAL FIELD

The present invention relates to a rechargeable electric tool.

BACKGROUND ART

JP-5-26278-U and JP-7-1350-A disclose rechargeable electric tools having a secondary battery as a driving power source, and a circuit for stopping a power supply to a motor when a battery voltage is lowered to a certain reference voltage that is equal to or higher than a discharge end voltage, thereby preventing the tool from being stopped during a working cycle due to a reduction of the battery voltage in use, and preventing a battery lifetime from being shortened due to an over-discharge to a level where the voltage of the secondary battery is reduced to be equal to or lower than the discharge end voltage. Some rechargeable electric tools also have a warning device that indicates a voltage reduction by means of an LED or a buzzer together with the circuit which controls a stoppage of the power supply.

As a secondary battery to be used in a rechargeable electric tool, a NiCd battery and a NiMH battery are most widely used. However, when a secondary battery of this kind is repeatedly charged in a state of a shallow depth of discharge which does not reach full discharge, it is known that there is a memory effect in which a power supply is stopped at a shallow depth of discharge, whereby an apparent battery capacity is reduced.

In a rechargeable electric tool having the control circuit for stopping the power supply to the motor when the battery voltage is lowered, the power supply to the motor is stopped when a terminal-to-terminal voltage of the secondary battery is lowered to the certain reference voltage, thereby prompting to charge or replace the secondary battery. However, In order to prevent the over-discharge from occurring, the reference voltage is set to be higher than the discharge end voltage of the secondary battery. Therefore, the battery is charged in a state of a relatively shallow depth of discharge. As a result, there is a problem that the battery capacity is gradually reduced due to the memory effect when the battery is repeatedly charged.

Moreover, in a cold and low temperature environment, the battery voltage is lowered. Thus, there is a case where the power stopping circuit activates even when the secondary battery is fully charged, so that the electric tool becomes unusable.

DISCLOSURE OF THE INVENTION

One or more embodiments of the invention provides a rechargeable electric tool in which problems such as a memory effect of a secondary battery, an unusable state due to a low temperature environment, and a reduction of a usable time are eliminated.

According to one or more embodiments of the invention, a rechargeable electric tool which uses a secondary battery as a power source includes a voltage comparing device which compares a voltage of the power source with a reference voltage that is equal to or higher than a threshold voltage at which the rechargeable electric tool is operable, and a warning device which indicates a warning in accordance with a result of the comparison. The warning device indicates the warning when the voltage of the power source is reduced to be equal to or lower than the reference voltage, and the rechargeable electric tool can be activated in response to an operation on a trigger switch even after the indication of the warning.

According to one or more embodiments of the invention, even after the voltage of the power source is reduced to be equal to or lower than the reference voltage and the warning is thus indicated by means of a buzzer, an LED, or the like, the rechargeable electric tool does not perform a control to interrupt the power supply to the motor, and accepts an activating operation. Therefore, even after the warning, operations can be carried out at least several times so that the battery can be replaced at the discretion of the user at an appropriate break time, not depending on a decision made by the tool. Moreover, an operation can be carried out even when the warning is indicated due to a reduction in an apparent voltage under a low temperature, so that usability and working efficiency are improved as compared with a configuration where the power supply to the motor is interrupted at the time when the warning is indicated.

Moreover, in a case where it is determined that a memory effect is generated in the battery, the activating operation can be repeated until the activation of the motor is disabled after the voltage warning is indicated, whereby the battery can be fully discharged to eliminate the memory effect. Therefore, the function of the battery can be easily restored.

BRIEF DESCRIPTION OF THE DRAWINGS

FIG. 2 is a flowchart showing an operation sequence of the reinforcing bar tying tool according to the invention.

Figure 1:
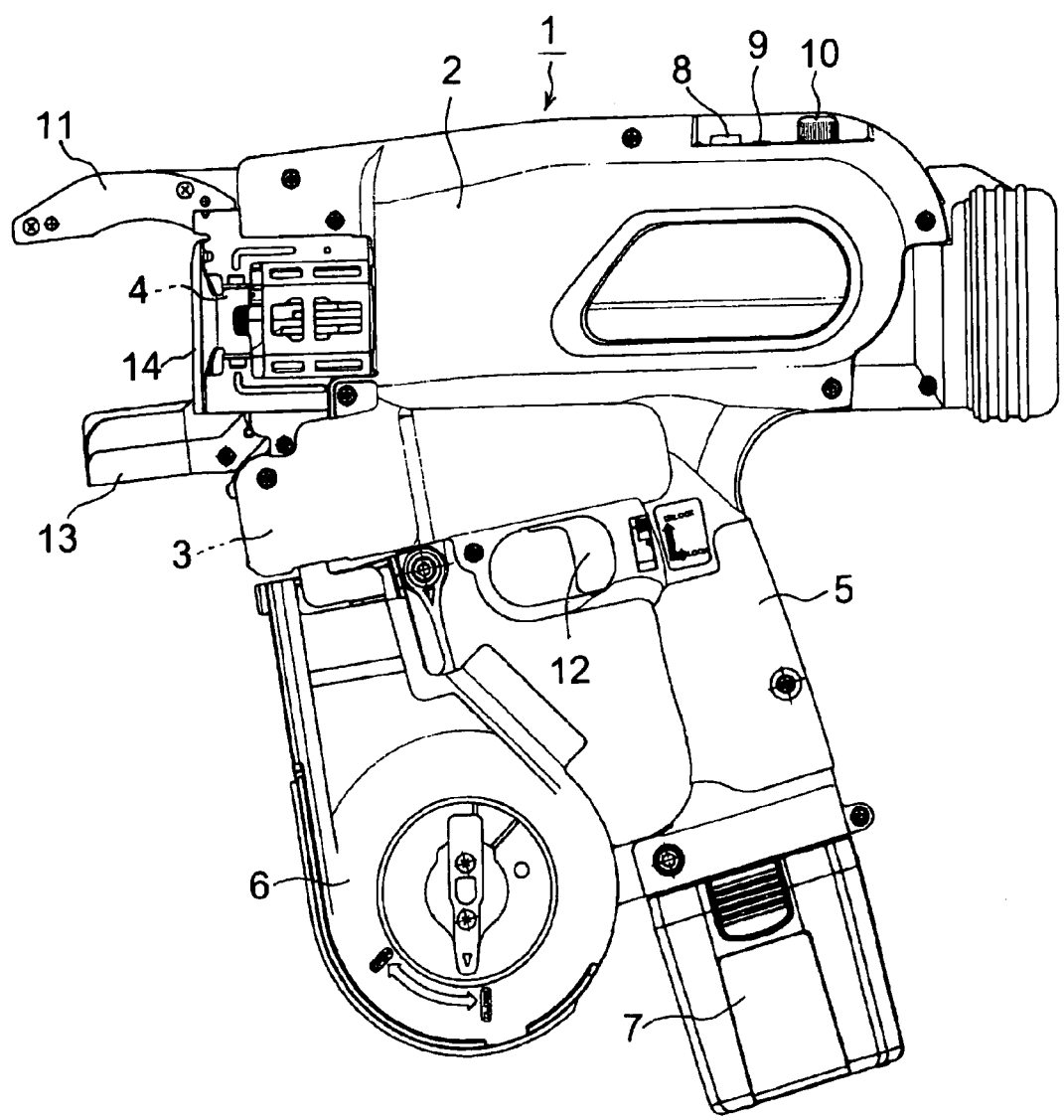
FIG. 1 is a side view of a reinforcing bar tying tool.

EXPLANATION OF REFERENCE NUMERALS 1 reinforcing bar tying tool
2 case
3 tie wire feeding mechanism
4 tie wire twisting mechanism
5 grip portion
6 magazine
7 battery pack
8 power source switch
9 voltage warning LED
10 twisting torque setting dial
11 wire guide nose
12 trigger lever
13 lower guard
14 side cover

BEST MODE FOR CARRYING OUT THE INVENTION

Hereinafter, embodiments of the invention will be described with reference to the drawings.

EMBODIMENT 1

FIG. 1 shows a reinforcing bar tying tool 1 as one example of an electric tool which uses a secondary battery as a driving power source. It includes a tie wire feeding mechanism 3 and a tie wire twisting mechanism 4 inside a case 2. A tie wire reel (not shown) is loaded in a magazine 6 which is disposed on a front side of a grip portion 5 of the case 2. A battery pack 7 containing a NiMH battery is attached to an end portion of the grip portion 5, and supplies an electric power to a feeding motor of the tie wire feeding mechanism 3 and to a twisting motor of the tie wire twisting mechanism 4 via a power supply circuit board (not shown).

A power source switch 8, a voltage warning LED 9, and a twisting torque setting dial 10 are disposed on an upper face of a rear portion of the reinforcing bar tying tool 1, and a voltage warning buzzer (not shown) is disposed inside the case 2.

When the power source switch 8 is turned on with the battery pack 7 being attached to the reinforcing bar tying tool 1, the reinforcing bar tying tool 1 executes an initializing operation, the tie wire feeding mechanism 3 feeds a tie wire by a constant length toward a wire guide nose 11 which is on an upper side, and then the tie wire twisting mechanism 4 performs a series of operations including clamping and twisting, and stops at its initial position, thereby attaining a standby state. After the standby state is attained, and when a trigger lever 12 is pulled, one cycle of reinforcing wire tying operations including feeding of the tie wire, clamping of the tie wire, pulling back of the tie wire, cutting of the tie wire, and twisting of the tie wire is continuously executed.

The tie wire feeding mechanism 3 has a configuration in which one of two V-grooved gears, which are arranged in a front and rear direction of the sheet of FIG. 1 and mesh with each other, is driven by the feeding motor, and the tie wire is fed out while being clamped between the two V-grooved gears. The tie wire is upwardly fed out from the tie wire reel in the magazine 6. The tie wire thus fed out id formed into an arcuate shape along a guide groove on an inner periphery of the wire guide nose 11 and is led around reinforcement bars, and a tip end of the tie wire is fed into the tie wire twisting mechanism 4.

The tie wire twisting mechanism 4 includes a twisting shaft which is not shown, and three clamping plates attached to a tip end of the twisting shaft. The three clamping plates are disposed inside a side cover 14 which is positioned between the wire guide nose 11 and a lower guard 13. Two clamping plates which are placed on respective sides of a middle clamping plate are opened and closed by a cam mechanism.

The tie wire is fed out through between the middle clamping plate and one of the outer clamping plates, and a control portion (not shown) feeds out the wire corresponding to a preset turn number and then stops the wire feeding. At this time, the tip end of the wire reaches a tip end of the wire guide nose 11. Thereafter, the twisting shaft and clamping plates of the tie wire twisting mechanism 4 are moved forward to clamp a wire loop, and then pull back the wire. A wire cutter (not shown) interlocks with the forward movement of the twisting shaft and cuts a rear end of the wire loop to separate the wire loop from a subsequent wire. At the same time, the rear end of the wire is clamped. Then, the twisting shaft and clamping plates of the tie wire twisting mechanism 4 are rotated to twist the clamped portion of the wire loop, whereby the reinforcement bars are bound. When a twisting torque of the twisting motor is raised to a certain preset value, the twisting operation is stopped. Thereafter, the twisting motor is reversely rotated, the clamping plates are opened, and the twisting shaft is returned to its initial position, thereby ending one cycle of the tying process.

The control portion monitors the voltage of the battery pack 7 via a voltage detecting circuit during the tying operation, and when the voltage of the battery pack 7 drops to a predetermined charge recommended voltage, sounds the buzzer and lights the voltage warning LED 9 to notify the voltage reduction.

FIG. 2 shows the operation sequence of the reinforcing bar tying tool 1. When the power source switch 9 is turned on (step 1), the above-described initializing operation (step 2) is executed to attain the standby state. When the trigger lever 12 is pulled to turn on a trigger switch (step 3), one cycle of the tying process is executed and the voltage of the battery pack 7 is detected (step 4). The battery voltage is compared with the predetermined reference voltage (the charge recommended voltage) (step 5). If the battery voltage is equal to or higher than the predetermined reference voltage, the operation returns to step 3 to execute the tying operation in response to the next trigger operation.

If the battery voltage is lower than the reference voltage as result of the comparison of the battery voltage with the reference voltage, the buzzer is sounded, and the voltage warning LED 9 is lit so that the voltage reduction is notified (step 6). However, the reinforcing bar tying tool 1 according the invention is different from a conventional one in that, when the battery voltage is reduced below the reference voltage, a warning is notified but the power supply to the motor of the tying mechanism is not interrupted. Therefore, even when the voltage warning is indicated (step 6), the tying operation subsequent to step 3 can be executed by pulling the trigger lever 12.

According to one or more embodiments of the invention, the reinforcing bar tying tool can perform the tying operation at least several times after the warning is indicated so that the battery pack can be replaced at the discretion of the user at an appropriate break time, not depending on a decision made by the tool.

According to one or more embodiments of the invention, in the reinforcing bar tying tool, an activation is not disabled by a stoppage of the power supply to the motor due to apparent voltage reduction under a very low temperature so that the tying operation can be carried out while ignoring the voltage warning. Therefore, usability is excellent.

In a case where it is determined that the memory effect is generated in the built-in battery of the battery pack, the built-in battery can be fully discharged to eliminate the memory effect by repeating the tying operation until the activation of the motor is disabled while ignoring the voltage warning, or by repeating the tying operation without the tie wire being loaded until the motor is stopped.

Although a buzzer generating a sound and the LED generating a light have been described as the warning device in the above embodiment, the warning may be given by means of a voltmeter, a liquid crystal display, or a display of a red mark. It is apparent that various modifications can be made within the technical scope of the invention, and that the invention extends also to such modifications. Furthermore, it is apparent that the invention is not restricted to a reinforcing bar tying tool, and may be applied to electric tools other than a reinforcing bar tying tool.

While the invention has been described in detail with reference to specific embodiments, it is obvious to those skilled in the art that various changes and modifications may be made without departing the spirit and scope of the invention.

The present application is based on Japanese Patent Application (No. 2005-004644) filed Jan. 12, 2005, the content of which is incorporated herein by reference.

INDUSTRIAL APPLICABILITY

In a rechargeable electric tool, it is possible to solve the problems occurring from a stoppage of a power supply to a motor at the time when a warning of voltage reduction is indicated.

The invention claimed is:

1. A rechargeable electric tool comprising:
   a power source which is a secondary battery;
   a power source switch that is electrically coupled to the power source and adapted to complete an initializing operation in the rechargeable electric tool and place the rechargeable electric tool in a standby state when the power source is electrically coupled to the rechargeable electric tool;

a trigger lever that is electrically coupled to the power source switch and adapted to complete one cycle of operation of the rechargeable electric tool when the trigger lever is pulled;

a voltage comparing device which compares a voltage of the power source with a reference voltage when the trigger lever is pulled; and a warning device which indicates a warning in accordance with a result of the comparison of the voltage comparing device, wherein when the voltage of the power source is reduced to be equal to or lower than the reference voltage, the warning device indicates the warning, and the trigger lever is unaffected such that the rechargeable electric tool is still operable from after the warning until the electric tool stops in response to the battery being fully discharged.

2. The rechargeable electric tool according to claim 1, wherein the reference voltage is higher than a threshold voltage at which the rechargeable electric tool is operable.

3. The rechargeable electric tool according to claim 1, wherein the trigger lever comprises a trigger switch, wherein, after the warning, the rechargeable electric tool is operable in response to an operation on the trigger switch.

4. The rechargeable electric tool according to claim 1, wherein the warning device includes a buzzer.

5. The rechargeable electric tool according to claim 1, wherein the warning device includes an LED.

6. The rechargeable electric tool according to claim 1, wherein the warning device includes a display device.

* * * * *